(12) United States Patent
Valíček et al.

(10) Patent No.: US 9,116,559 B2
(45) Date of Patent: Aug. 25, 2015

(54) OPTICS FOR PENCIL OPTICAL INPUT COMPUTER PERIPHERAL CONTROLLER

(75) Inventors: Štefan Valíček, Višňové (SK); Alexandr Mihál, Předklášteří (CZ); Marek Mihál, Předklášteří (CZ)

(73) Assignee: O.PEN S.R.O., Trencin (SK)

( * ) Notice: Subject to any disclaimer, the term of this patent is extended or adjusted under 35 U.S.C. 154(b) by 0 days.

(21) Appl. No.: 13/988,985

(22) PCT Filed: Nov. 20, 2011

(86) PCT No.: PCT/SK2011/050019
§ 371 (c)(1),
(2), (4) Date: May 22, 2013

(87) PCT Pub. No.: WO2012/071020
PCT Pub. Date: May 31, 2012

(65) Prior Publication Data
US 2013/0241898 A1    Sep. 19, 2013

(30) Foreign Application Priority Data
Nov. 22, 2010  (SK) .............................. 50090-2010 U

(51) Int. Cl.
*G06F 3/0354* (2013.01)
*G06F 3/03* (2006.01)
*G06F 3/038* (2013.01)

(52) U.S. Cl.
CPC .......... *G06F 3/03545* (2013.01); *G06F 3/0317* (2013.01); *G06F 3/0386* (2013.01); *G06F 3/03542* (2013.01); *G06F 3/03543* (2013.01)

(58) Field of Classification Search
CPC ............ G06F 3/03541; G06F 3/03542; G06F 3/03543; G06F 3/03545; G06F 3/033; G06F 3/0317; H01L 31/12; H01L 33/00; G06K 9/24; G06K 9/00154; G06K 7/10603; G01B 11/00; A63F 9/02; A63F 13/04; A63F 13/06; F41A 33/02; F41G 3/2616; F41J 5/02; H03K 17/9627; H03K 17/78; H03K 17/941; H03K 17/968
USPC .......... 345/179, 166, 419, 156, 157; 362/560; 235/462.49, 454; 178/18.09; 382/189
See application file for complete search history.

(56) References Cited

U.S. PATENT DOCUMENTS 6,317,266 B1 * 11/2001 Yoshimura et al. ........... 359/619
6,741,234 B2 * 5/2004 Son ............................... 345/166

(Continued)

FOREIGN PATENT DOCUMENTS

| CN | 201107746 Y | 8/2008 |
| WO | WO 2005/033923 A1 | 4/2005 |

OTHER PUBLICATIONS

International Search Report (PCT/ISA/210) issued on Apr. 12, 2012, by the Slovakian Patent Office as the International Searching Authority for International Application No. PCT/SK201/050019.

*Primary Examiner* — Gerald Johnson
*Assistant Examiner* — Darlene M Ritchie
(74) *Attorney, Agent, or Firm* — Buchanan Ingersoll & Rooney PC

(57) ABSTRACT

The invention relates to mechanical construction of the optics for a pencil optical input peripheral device for fast and comfortable computer control. The input light reflecting element and at least one convex or aspherical lens is fitted above the input opening aslant to the axis of the longitudinal pencil body in the angled tube. There is a scan sensor fitted behind the output opening of the angled tube. There is also the light source beside the input opening of the angled tube in the recessed opening of the longitudinal pencil body. Axes of the light source and the input opening of the angled tube are at an acute angle. The output light reflecting element can be fitted before the scan sensor aslant to the axis of the longitudinal pencil body in the angled tube and the light permeable cover can be fitted before the input opening of the angled tube and/or behind the light source. The input light reflecting element and/or the output light reflecting element consist of plane mirrors or light reflecting prisms.

8 Claims, 1 Drawing Sheet

(56) References Cited

U.S. PATENT DOCUMENTS

| | | | |
|---|---|---|---|
| 7,868,281 B2* | 1/2011 | Leong et al. | 250/208.1 |
| 7,872,639 B2* | 1/2011 | Theytaz et al. | 345/166 |
| 7,983,455 B2* | 7/2011 | Moise et al. | 382/120 |
| 9,029,756 B2* | 5/2015 | Chen et al. | 250/221 |
| 2003/0112220 A1* | 6/2003 | Yang et al. | 345/156 |
| 2003/0146906 A1* | 8/2003 | Lin | 345/179 |
| 2005/0007346 A1* | 1/2005 | Ma et al. | 345/166 |
| 2006/0028456 A1* | 2/2006 | Kang | 345/179 |
| 2006/0087495 A1* | 4/2006 | Davis et al. | 345/166 |
| 2006/0202975 A1* | 9/2006 | Chiang | 345/179 |
| 2006/0232556 A1* | 10/2006 | Chien | 345/166 |
| 2006/0279545 A1* | 12/2006 | Lan et al. | 345/166 |
| 2007/0024600 A1* | 2/2007 | Chang et al. | 345/179 |
| 2007/0057166 A1* | 3/2007 | Kuo et al. | 250/221 |
| 2007/0181785 A1* | 8/2007 | Helbing et al. | 250/221 |
| 2007/0211472 A1* | 9/2007 | Yao | 362/297 |
| 2007/0236455 A1* | 10/2007 | Cheah et al. | 345/166 |
| 2008/0150897 A1* | 6/2008 | Lin | 345/166 |
| 2008/0204415 A1* | 8/2008 | Jung et al. | 345/166 |
| 2008/0231600 A1* | 9/2008 | Smith | 345/166 |
| 2009/0159780 A1* | 6/2009 | Koay et al. | 250/206.1 |
| 2009/0295718 A1* | 12/2009 | Cheah et al. | 345/158 |
| 2010/0214224 A1* | 8/2010 | Dolfi | 345/166 |
| 2010/0271305 A1 | 10/2010 | Chen et al. | |
| 2010/0328272 A1* | 12/2010 | Craven-Bartle et al. | 345/179 |

* cited by examiner

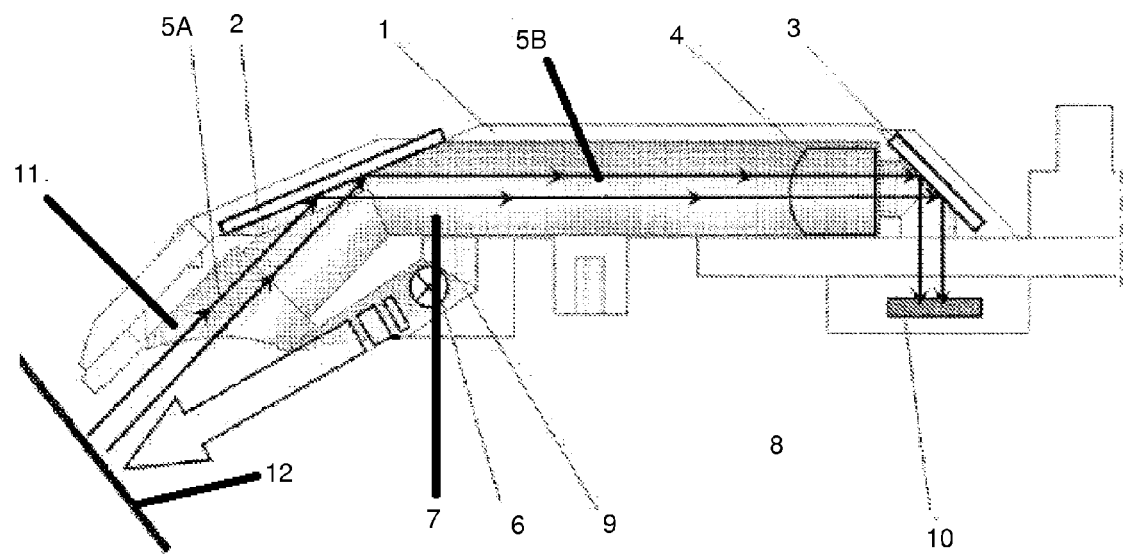

OPTICS FOR PENCIL OPTICAL INPUT COMPUTER PERIPHERAL CONTROLLER

FIELD OF THE INVENTION

The invention relates to mechanical construction of the optics for pencil optical input peripheral device for fast and comfortable computer control.

SUMMARY OF THE INVENTION

The peripheral device, so called position indicator "X-Y", informally called the "Mouse" in general, is currently the most widespread peripheral device for easy and fast computer control. It is basically a small box with at least two buttons. The body of such a device is of longitudinal shape, resolved ergonomically to be handheld by the user from the upper side so that the user can move it by hand along with the computer keyboard on a clean and even surface, e.g. on a reference material or on a special pad. The mouse movement is transferred to cursor movement on a computer monitor using special sensors. The classic mechanical/optical mouse allowing the input of two-dimensional information using the position sensor in the form of a ball placed in the bottom mouse part in a rotating manner with resolution of cca. 200-2400 dpi is well-known. However, the optical mouse with the position sensor inside which consists of a light transmitter and receiver, e.g. infrared (based on LED diodes) or laser, etc., is the most popular.

The optical module used for motion detection of the optical mouse on the reference material according to the patent CN 201107746 (Y) consists of a transparently covered opening in the body of the mouse with a light source, e.g. LED diode, light bulb, laser generator, etc. placed on the upper side of the opening. The light source directly illuminates the scanned reference material. The reference material reflects the light beams into a detector, e.g. CMOS photosensor, which is placed slantwise on the other side of the opening of the body of the mouse and inclined in such way so that the light beams strike the detector at the right angle. CMOS sensor scans the surface (frame count relates to mouse frequency) and these "images" of the surface are constantly compared. The principle that no surface of the reference material is perfectly smooth is applied here, i.e. not even a small section of the illuminated surface of the reference material is smooth, e.g. two millimeters of the surface are not identical. The scan sensitivity of the surface directly relates to mouse detection data in the range 800-3000 dti (dot per inch). When images do not match the device shows the correspondent direction of movement on the computer screen.

The optical mouse according to patent US 2010271305 (A1) with aspherical lenses and sensor placed in the body of the mouse which can be transparently covered is also well known. The first aspherical lens is placed on one side above the transparent opening cover of the body and under the light source, e.g. LED diode, light bulb, etc., so that the entire space of the opening of the body or its prevailing part is equally illuminated. The photosensor of the reflected light is fitted aslant to the reference material on the other side of the opening. The second aspherical lens above the transparent cover of the body is fitted in such way that the sensor detects the entire surface of the reference material or at least the prevailing part of it.

The present optical mouse solutions for PC require a large space for fitting the photo sensor which are not suitable to install into a small-diameter longitudinal case (e.g. pen-shaped, pencil-shaped, cylinder-shaped, etc.). For this reason the attempts to fit all the necessary optical mouse components for PC into a thin longitudinal case (e.g. pen-shaped, pencil-shaped, cylinder-shaped, etc.) under 28 mm in diameter which is too bulky for pencil optical input computer peripheral controller. Such solutions have due to their construction low sensitivity to scanned surface, i.e. if the surface is not structurally distinct enough the sensitivity to image modification is very low.

THE BASIS OF THE INVENTION

The above mentioned disadvantages are substantially eliminated by the optics for the pencil optical input computer peripheral controller according to the invention consisting of the longitudinal pencil body in which an angled tube is fitted, with at least one reflection area, scan sensor and light source. The invention essence is that an input light reflecting element and at least one convex or aspherical lens is fitted above the input opening into the axis of the longitudinal pencil body in the angled tube. The scan sensor is fitted behind an output opening of the angled tube. The light source is fitted beside the input opening of the angled tube in the recessed opening of the body. Axes of the light source and the input opening of the angled tube are at an acute angle.

It is helpful if there is the output light reflecting element fitted aslant to the axis of the longitudinal pencil body in the angled tube.

Furthermore, it is helpful if the input light reflecting element and/or the output light reflecting element consist of plane mirrors or light reflecting prisms.

It is also helpful if there is a light permeable cover fitted before the input opening of the angled tube and/or behind the light source.

The device according to the invention is intended for fitting and installing the photosensor into a small-diameter longitudinal case (e.g. pen-shaped, pencil-shaped, cylinder-shaped, etc.) under 14 mm in diameter which is suitable for a pencil optical input computer peripheral controller. Such a solution due to its construction also provides a higher sensitivity to a scanned surface compared to a present state of invention, i.e. it is more sensitive to motion on a reference material of less distinct structure.

BRIEF DESCRIPTION OF THE DRAWINGS

A particular example of invention implementation is diagrammatically represented on the attached drawings.

FIG. 1 illustrates an implementation example of the optics for pencil optical input peripheral device for fast and comfortable computer control. The input light reflecting element and the output light reflecting element are fitted aslant to the axis of the longitudinal pencil body in the opposite ways in the angled tube.

DETAILED DESCRIPTION

The particular example of a pencil optical input peripheral device for fast and comfortable computer control according to the invention displayed in FIG. 1 consists of a longitudinal pencil body 7 which contains an angled tube 1, an input light reflecting element 2, an output light reflecting element 3, a scan sensor 10 and a light source 6, e.g. light bulb or infrared source (on LED diode basis), or laser source, etc. The input light reflecting element 2 consisting of the plane mirror is placed aslant to an axis of the longitudinal pencil body 7. The input light reflecting element 2 is placed above an input opening 5A and a convex lens 4 is placed above a continuation of the input opening 5B in the angled tube 1. The scan sensor 10, e.g. CMOS, is fitted behind the output opening 8 of the angled tube 1. The light source 6 beside the output opening 8 of the angled tube 1 in the recessed opening 9 of the longitudinal pencil body 7. Axes of the light source 6 and the input opening 5A of the angled tube 1 are at acute angle. The output light reflecting element 3 which consists of the plane mirror is fitted before the scan sensor 10 aslant to the axis of the longitudinal pencil body 7 in the angled tube 1. There is also a light permeable cover 11 against impurity contamination fitted before the input opening 5A of the angled tube 1 and the light source 6.

The user holds the longitudinal pencil body in his/her hand in a well-known not displayed manner under appropriate inclination grasping the longitudinal pencil body as if writing with a thicker common pencil so that the tip (by a firm grasp or using a microswitch button) can move in various directions on a clean and even surface of a reference material 12, e.g. on a table, a paper or at best on the commonly used mousepad. The needed distance between the light permeable cover 11 and the surface of the reference material 12 continuously illuminated by the light source 6 is thus kept. The light beams from the light source 6 strike the scanned surface of the reference material 12 and also ensure this optical system's resistance against different light sources while operating the computer. Light beams emitted by the light source 6 are first reflected from the surface of the reference material 12, pass through the light permeable cover 11 of the input opening 5A of the angled tube 1, strike the input light reflecting element 2 which reflects the light beam into the axis of the longitudinal pencil body 7. The light beams in the angled tube 1 are compressed and reinforced by the convex lens 4 and reflected with great sharpness from the output light reflecting element 3 onto the surface of the scan sensor 10. The scan sensor 10 scans the surface of the reference material 12 in a well-known not displayed manner (frame count relates to mouse frequency) and these "images" of the surface are constantly compared. The principle that no surface of the reference material is perfectly smooth is applied here, i.e. not even a small section of the illuminated surface of the reference material is smooth. The scan sensitivity of the surface directly relates to mouse detection data in the range 800-3000 dti (dot per inch). When images do not match, the device shows the correspondent direction of movement on the computer screen.

The described and depicted implementation is not the only possible solution according to the invention. The scan sensor 10 according to this solution can be placed directly behind the convex lens 4 in the axis of the angled tube 1 without using the output light reflecting element 3. The lens 4 can be aspherical. The input light reflecting element 2 and/or the output light reflecting element 3 can exist in a form of the light reflecting prism. The light source 6 does not require the light permeable cover 11.

INDUSTRIAL APPLICABILITY

A pencil optical input peripheral device is intended for fast and comfortable computer control using a thin longitudinal pencil input peripheral device. It can be used as a simple computer scanner, too.

The invention claimed is:

1. A pencil optical input computer peripheral controller comprising:
   a longitudinal pencil body including a first angled tube with at least one reflection area, distinguished by a position of an input light reflecting element and at least one convex or aspherical lens which is fitted above an input opening aslant to a first axis of the longitudinal pencil body in the first angled tube;
   a scan sensor which is fitted behind an output opening of the first angled tube;
   an output light reflecting element which is fitted before the scan sensor; and
   a light source, wherein the light source is fitted in a recessed opening of a second tube separate from the longitudinal pencil body; and
   wherein a second axis formed along the direction of incoming light from the light source in the second tube and the first axis parallel to the first angled tube of the longitudinal pencil body containing the input opening create an acute angle; and
   wherein the first axis is aslant to a third axis parallel to the first angled tube of the longitudinal pencil body containing the output opening.

2. The pencil optical input computer peripheral controller pursuant to claim 1 wherein the input light reflecting element and/or the output light reflecting element comprise plane mirrors or light reflecting prisms.

3. The pencil optical input computer peripheral controller pursuant to claim 2 further including a light permeable cover which is fitted before the input opening of the angled tube and/or behind the light source.

4. A pencil optical input computer peripheral controller comprising:
   a longitudinal pencil body including a first angled tube with at least one reflection area, distinguished by a position of an input light reflecting element and at least one convex or aspherical lens which is fitted above an input opening aslant to a first axis of the longitudinal pencil body in the first angled tube;
   a scan sensor which is fitted behind an output opening of the first angled tube;
   an output light reflecting element which is fitted before the scan sensor; and
   a light source, wherein the light source is fitted in a recessed opening of a second tube separate from the longitudinal pencil body; and
   wherein a second axis formed along the direction of incoming light from the light source in the second tube and the first axis parallel to the first angled tube of the longitudinal pencil body containing the input opening create an acute angle; and
   wherein the first axis is aslant to a third axis parallel to the first angled tube of the longitudinal pencil body containing the output opening; and
   wherein a light permeable cover is fitted before the input opening of the angled tube, such that a light beam reflected from a surface of a reference material passes through the light permeable cover and then through the input opening.

5. The pencil optical input computer peripheral controller pursuant to claim 4 wherein the input light reflecting element and/or the output light reflecting element comprise plane mirrors or light reflecting prisms.

6. A pencil optical input computer peripheral controller comprising:
   a longitudinal pencil body including a first angled tube with at least one reflection area, distinguished by a position of an input light reflecting element and at least one convex or aspherical lens which is fitted above an input opening aslant to a first axis of the longitudinal pencil body in the first angled tube;

a scan sensor which is fitted behind an output opening of the first angled tube;

an output light reflecting element which is fitted before the scan sensor; and a light source, wherein the light source is fitted in a recessed opening of a second tube separate from the longitudinal pencil body; and wherein a second axis formed along the direction of incoming light from the light source in the second tube and the first axis parallel to the first angled tube of the longitudinal pencil body containing the input opening create an acute angle; and wherein the first axis is aslant to a third axis parallel to the first angled tube of the longitudinal pencil body containing the output opening; and wherein the scan sensor is located at an end of the longitudinal pencil body.

7. The pencil optical input computer peripheral controller pursuant to claim 6 wherein the input light reflecting element and/or the output light reflecting element comprise plane mirrors or light reflecting prisms.

8. The pencil optical input computer peripheral controller pursuant to claim 7 further including a light permeable cover which is fitted before the input opening of the angled tube.

* * * * *